Sept. 9, 1969   N. G. SCHREWELIUS   3,465,965
TAIL-PIPE NOZZLE FOR ROCKET MOTORS
Filed April 18, 1967
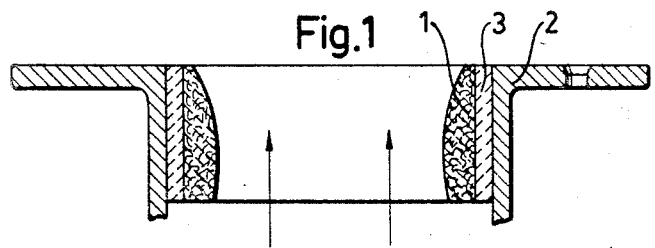
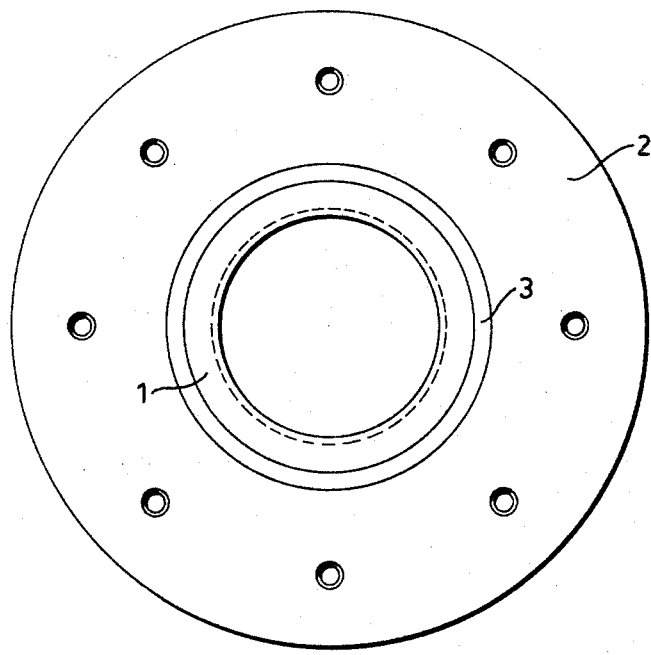
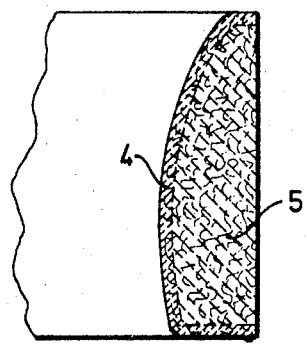
INVENTOR
NILS GUSTAV
SCHREWELIUS
BY
ATTORNEYS 3,465,965
TAIL-PIPE NOZZLE FOR ROCKET MOTORS
Nils Gustav Schrewelius, Hallstahammar, Sweden, assignor to Aktiebolaget Kanthal, Hallstahammar, Sweden
Filed Apr. 18, 1967, Ser. No. 631,653
Claims priority, application Sweden, Apr. 20, 1966, 5,362/66
Int. Cl. B64d 33/04; F02k 1/22
U.S. Cl. 239—265.15                                    6 Claims

ABSTRACT OF THE DISCLOSURE

A nozzle for a tail-pipe section of rocket motors having at least on the inside a fine-mesh, three-dimensional skeleton of recrystallized silicon carbide, and in the cavities of this skeleton an evenly distributed continuous phase of a metallic component, namely, molybdenum disilicide. The metallic component forms 30–80% by weight of the mass in the part exposed to the hot gases of the rocket motor. The material inside the surface layer subjected to such hot gases has a porosity exceeding that of the surface layer and has continuous paths from the interior to the surface to permit the escape of vaporized metallic component. The porosity of the surface layer is substantially less than 1% by volume. During use of the metallic component partly volatilizes at the high temperatures to which it is subjected thereby to provide capacity to withstand high temperatures during use.

---

The invention submitted herewith concerns a nozzle for the tail-pipe section of rocket motors in the form of a cylindrical tube, the bore of which is subjected to extreme corrosion, erosion and temperature shock, consisting, at least on the inside, of a fine-mesh, three-dimensional skeleton of recrystallized silicon carbide, and in the cavities of this skeleton an evenly distributed metallic component with a high melting point.

The temperature at blast-off of the rocket reaches several thousand degrees and there is no material capable of withstanding this heat for any length of time. The burning time is, however, short, in one case not more than about 30 seconds, so that one has to make do with a material which will permit the function of the nozzle to be maintained during this short time.

The British Patent 992,257 proposes the use of a material principally consisting of silicon carbide and from 1 to 30% by weight of a heat-resisting component containing chemical compounds of one or more of the metals wolfram, chromium, iron, hafnium, tantalum, titanium, zirconium and molybdenum. An example of such a component is $MoSi_2+TaSi_2$.

It has, however, been found that this well-known nozzle does not fulfill requirements and disintegrates too quickly.

The invention submitted herewith is concerned with producing such a nozzle capable of withstanding the high temperature at least during the burning time of the rocket, the basis being that the metallic component is in the form of interacting particles which, apart from metal, contain 10–70% by weight of silicon. This means that the metallic component must be in sufficient quantity to enable the different particles to interact with each other and form continuous bridges or chains inside and throughout the silicon carbide body. It has, surprisingly, been found that by observing this rule a considerably higher heat resistance can be achieved. The explanation would seem to be that the metallic silicide boils in those parts of the nozzle nearest to the bore and that through binding of the evaporation heat a cooling effect takes place. The fact that the silicide occurs in sufficiently large quantities for the existence of interacting particles, which assumes corresponding cavities throughout the carbide skeleton, means that more molybdenum silicide is exuded successively, producing a continuous cooling effect so that the silicon carbide skeleton remains intact and is not disintegrated by evaporation pressure.

A nozzle of this type can be produced by forming a preliminary body of non-recrystallized SiC powder+an organic binding agent, which is surrounded by an infiltration agent, for example, in the form of molybdenum and silicon, and heated to 2100° C., whereupon the organic binding agent is burnt up or dispersed and the silicide melts, filling up the available pores in the form body. At the same time recrystallization of the carbide takes place at a slightly lower temperature than with pure silicon carbide. By this means the body becomes non-porous and a continuous silicide phase is formed inside and throughout the carbide skeleton. See, for example, the British Patent No. 976,468. In this connection it should, however, be pointed out that the body described in the British Patent No. 992,257 is not produced by infiltration of the metallic component, so that the silicide particles are separated from each other in cavities which do not communicate with each other. Furthermore, the silicide content is lower than is the case with the invention submitted herewith, and bodies of the type mentioned in this patent thus run the risk of being disintegrated when subjected to the enormous heat involved here due to the evaporation of the totally enclosed silicide particles.

The attached drawing shows the construction of a nozzle in accordance with this invention, FIG. 1 being a transverse section and FIG. 2 an end view of the nozzle 1. This is intended for building into a cylindrical retainer 2 made of, for example, copper. The gap between the retainer and nozzle is filled with impregnated asbestos 3.

FIG. 3 shows a modification in an enlarged fragment of a section through the nozzle 1. It can be seen from this that the actual nozzle consists of a mass with different compositions in the surface layer 4 facing the hot gases and the inner part 5 protected from direct contact with the gases. Before impregnation with $MoSi_2$, the silicon carbide skeleton of the surface layer can have a grain size of up to a maximum of 40 micrometres and a porosity of about 25% by volume, while the silicon carbide skeleton of the inner part 5 has a grain size of not more than 10 micrometres and a porosity of up to 40% by volume. When the nozzle is subsequently impregnated with $MoSi_2$ it is found that the pores of the surface layer 4 are completely filled, making the layer virtually non-porous, whereas the pores of the inner part 5 have not been completely filled, leaving cavities in the mass to the extent of about 15% by volume. This has the following consequences. When subjected to rapid heating the surface layer expands, setting up heat stresses in relation to the inner, cooler part. Due to its porosity, this part exhibits a certain amount of elasticity which is found to be sufficient to counteract crack formation which would otherwise occur in the material.

In a laboratory test the nozzle was given the form of a Laval Tuyère with an internal diameter at the narrowest point of only 9.8 mm. It was subjected to a gas flow at a temperature of 2100° C. for 35 seconds. The speed of flow in the tuyère at the narrowest part was estimated at 980 metres per second. After completion of the test the diameter was measured again and was found to have increased to 9.9 mm., showing that corrosion had amounted to 0.1 mm., corresponding to a reduction in wall thickness of only 0.05 mm.

I claim:
1. A nozzle for the tail pipe section of rocket motors in the form of a cylindrical tube, the bore of which is subjected to extreme corrosion, erosion and temperature shock, the surface layer of the bore of said tube and interior portions of said tube consisting of a fine mesh, three-dimensional skeleton of recrystallized silicon carbide, and in the cavities of this skeleton a continuous phase of a metallic component, said metallic component consisting essentially of molybdenum disilicide, said metallic component forming 30–80% by weight of the mass in said surface layer, the material of said interior portions having a porosity exceeding that of the surface layer, the porosity of said surface layer being substantially less than 1% by volume, said metallic component forming a continuous phase from said interior portions to said surface layer and partly volatilizing at high temperatures thereby to provide continuous paths from the interior to the surface to permit the escape of vaporized metallic component, thereby to provide capacity to withstand high temperatures during use.

2. A nozzle in accordance with claim 1, characterized by the fact that the composition of the metallic component is such that the melting point exceeds 1800° C.

3. A nozzle in accordance with claim 1, characterized by the fact that the grain size of the silicon carbide is less than 50 microns.

4. A nozzle in accordance with claim 1, characterized by the fact that it has a material thickness of less than 10 mm. and is mounted in a retainer of another material.

5. A nozzle in accordance with claim 1, characterized by the fact that the silicon carbide grains in the surface layer, which have a maximum grain size of 40 micrometres, are larger than the silicon carbide grains of the interior portions, the latter grains having a grain size of not more than 10 micrometres.

6. A nozzle in accordance with claim 1, characterized by the fact that the silicon carbide grains form 75% by volume of the surface material but only 60% by volume of the interior portions.

References Cited

UNITED STATES PATENTS

| | | |
|---|---|---|
| 2,987,874 | 6/1961 | Nicholson. |
| 3,036,017 | 5/1962 | Schrewelius _____ 106—44 X |
| 3,165,864 | 1/1965 | Shulze. |
| 3,189,472 | 6/1965 | Taylor _____ 106—44 X |
| 3,189,477 | 6/1965 | Shaffer. |
| 3,200,585 | 8/1965 | Climent et al. |
| 3,226,929 | 1/1966 | McKenna _____ 239—265.15 X |
| 3,246,275 | 4/1966 | Schrewelius _____ 106—44 X |
| 3,285,013 | 11/1966 | Bell _____ 239—591 X |

M. HENSON WOOD, JR., Primary Examiner

BERNARD BELKIN, Assistant Examiner

U.S. Cl. X.R.

60—200